US008201080B2

(12) United States Patent
Basson et al.

(10) Patent No.: US 8,201,080 B2
(45) Date of Patent: Jun. 12, 2012

(54) SYSTEMS AND METHODS FOR AUGMENTING AUDIO/VISUAL BROADCASTS WITH ANNOTATIONS TO ASSIST WITH PERCEPTION AND INTERPRETATION OF BROADCAST CONTENT

(75) Inventors: Sara H. Basson, White Plains, NY (US); Alexander Faisman, Croton-on-Hudson, NY (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1277 days.

(21) Appl. No.: 11/439,806

(22) Filed: May 24, 2006

(65) Prior Publication Data
US 2007/0277092 A1    Nov. 29, 2007

(51) Int. Cl.
G06F 17/00    (2006.01)
(52) U.S. Cl. ........... 715/230; 715/753; 715/863; 725/60
(58) Field of Classification Search .................. 715/230, 715/233
See application file for complete search history.

(56) References Cited

U.S. PATENT DOCUMENTS

| | | | | |
|---|---|---|---|---|
| 5,732,232 | A * | 3/1998 | Brush et al. | 715/751 |
| 7,089,504 | B1 * | 8/2006 | Froloff | 715/839 |
| 7,434,176 | B1 * | 10/2008 | Froloff | 715/839 |
| 2004/0130614 | A1 * | 7/2004 | Valliath et al. | 348/14.01 |
| 2005/0069852 | A1 * | 3/2005 | Janakiraman et al. | 434/236 |
| 2005/0132420 | A1 * | 6/2005 | Howard et al. | 725/135 |
| 2006/0010240 | A1 * | 1/2006 | Chuah | 709/228 |

* cited by examiner

Primary Examiner — Amelia Rutledge
Assistant Examiner — Quoc A Tran
(74) Attorney, Agent, or Firm — F. Chau & Associates, LLC; Anne V. Dougherty, Esq.

(57) ABSTRACT

Systems and methods are provided for augmenting audio/visual broadcasts (e.g., movies) with non-textual annotations that are designed to assist an individual to interpret or otherwise understand the content of the audio/visual broadcast. For example, the non-textual annotations can be in the form of visual cues, audio cues, tactile cues, olfactory cues, and/or other types of non-textual cues that assist persons with certain types of sensory deficiencies or cognitive disabilities to understand and interpret the content of a broadcast.

13 Claims, 5 Drawing Sheets

US 8,201,080 B2

SYSTEMS AND METHODS FOR AUGMENTING AUDIO/VISUAL BROADCASTS WITH ANNOTATIONS TO ASSIST WITH PERCEPTION AND INTERPRETATION OF BROADCAST CONTENT

TECHNICAL FIELD OF THE INVENTION

The present invention generally relates to systems and methods for augmenting audio/visual broadcasts with annotations that assist with human perception and interpretation of broadcast content and, in particular, systems and method for augmenting audio/visual broadcasts with non-textual annotations (e.g., visual, audio, tactile and/or olfactory cues) that assist individuals with sensory deficiencies or cognitive disabilities in, perceiving, interpreting or otherwise understanding the content of such broadcasts.

BACKGROUND

In general, there are various types of disorders that can adversely affect (on various levels) an individual's ability to process information, or otherwise interpret what the individual sees or hears. For example, individuals with Autism or other forms of PDD (pervasive development disorders) can have significant cognitive impairment including an inability to comprehend the perspectives of others and difficulty in processing diverse information in context.

By way of specific example, Autistic individuals typically have difficulty recognizing and interpreting emotional information. Although facial expressions are one way to interpret a person's emotional state, Autistic individuals typically avoid eye contact and do not focus another person's face and, thus, may not learn how to recognize and interpret emotion through facial expressions. Even when autistic individuals are trained to focus upon another's face, a severely autistic person may simply lack the ability to read or interpret emotion from facial expressions.

In addition to facial expressions, a person's behavioral characteristics (e.g., the manner in which a person moves his/her hands or otherwise gestures, walks, speaks etc.) can be indicative of an individual's emotional state. However, it is difficult for Autistic individuals to recognize and interpret emotional state based on subtle clues from a person's behavior.

The inability of an autistic individual to recognize and interpret emotional state or other information while watching a movie, for example, is even more problematic. When an autistic person watches a movie, the person will usually fix his/her attention on specific details that are not related to main events, e.g. fix attention on non-animated objects. Even if an autistic individual is trained to focus on the faces of others, such skills are not sufficient to recognize or otherwise interpret emotional states of individuals in a movie scene. For example, if there are multiple people in a given scene, an autistic individual may not be able to focus his/her attention on the right person(s) during a current episode.

The ability to recognize or otherwise interpret emotions can even be difficult for individuals without cognitive disabilities. Indeed, a normal person may find it difficult to correctly interpret an individual's emotional state when the person is from a different culture. Similarly, differences in age (child vs. adult) and sex (female vs. male), for example, may render it difficult for individuals to properly recognize and interpret emotional state in a social environment. Thus, it would be beneficial to develop techniques that would allow persons to learn how to correctly recognize and interpret subtle emotions, and thus, develop skills needed for interpreting emotional state of people in a social environment.

SUMMARY OF THE INVENTION

Exemplary embodiments of the invention generally include systems and methods for augmenting audio/visual broadcasts with annotations that assist with human perception and interpretation of broadcast content. In particular, exemplary embodiments of the invention include systems and method for augmenting audio/visual broadcasts with non-textual annotations (e.g., visual, audio, tactile and/or olfactory cues) that assist individuals having sensory deficiencies or cognitive disabilities in, perceiving, interpreting or otherwise understanding the content of such broadcasts.

In one exemplary embodiment, a method for annotating content of content data stream includes receiving a content data stream, annotating content of the content data stream with metadata that symbolically describes the content, and processing the content data stream and annotated content to output the content data stream augmented with non-textual annotations that assist an individual in the interpretation or cognition of the annotated content. In one exemplary embodiment, the non-textual annotations are provided to symbolically represent emotional content. For example, the metadata can symbolically represent a type of emotion and the level of the emotion. Other types of informational content in a content data stream can be annotated as desired for the given application.

In another exemplary embodiment, the content data stream is annotated by identifying segments of the content data stream that are representative of a type of information to be annotated, and labeling said identified segments with metadata that symbolically represents the information. The process of identifying and labeling can be performed using automated, semi-automated or manual techniques. The metadata labels can be used for rendering the non-textual annotations in one or more types of annotation modalities, such as visual annotations, tactile annotations, olfactory annotations, and/or audio annotations depending on the needs of the user.

In another exemplary embodiment of the invention, a method for annotating content of content data stream includes receiving a content data stream, annotating content of the content data stream with metadata that symbolically describes the content, outputting the content of the content data stream in a modality that is directly perceptible by an individual, and processing the annotated content to output a metadata stream in synchronization with the output content data stream, wherein the metadata data stream is output in a form that is not directly perceptible by an individual, but can be detected and processed using a personal annotation output device to output non-textual annotations in a modality that is perceptible by a user of said device to assist the user in the interpretation or cognition of the annotated content.

For example, the metadata is rendered using a personal annotation output device such as a head mounted display, special glasses, a speakerphone, tactile transducers, etc. By using a personal annotation output device, personalized metadata can be generated and broadcast to one or more individuals viewing a broadcast (e.g., movie) such that different types of non-textual annotations in different modalities and representative of different informational content can be provided to different users to address specific needs of such users.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Systems and methods for augmenting audio/visual broadcasts (e.g., movies) with non-textual annotations (e.g., visual, audio, tactile, olfactory cues) that are designed to assist an individual to interpret or otherwise understand the content of the audio/visual broadcast, will now be described in further detail. It is to be understood that the systems and methods described herein may be implemented in various forms of hardware, software, firmware, special purpose processors, or a combination thereof. For example, exemplary systems and methods can be implemented in software as an application comprising program instructions that are tangibly embodied on one or more program storage devices (e.g., hard disk, magnetic floppy disk, RAM, CD ROM, ROM and Flash memory) and executable by any device or machine comprising suitable architecture. It is to be further understood that since the constituent system modules and method steps depicted in the accompanying Figures may be implemented in software, the actual connections between the system components (or the flow of the process steps) may differ depending upon the manner in which the present invention is programmed. Given the teachings herein, one of ordinary skill in the related art will be able to contemplate these and similar implementations or configurations of the present invention.

Figure 1A:
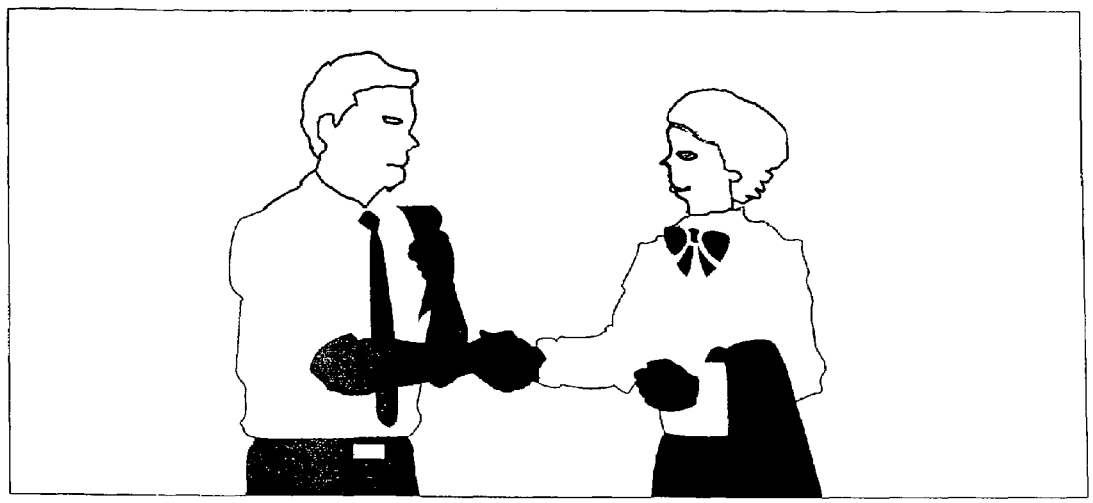
FIGS. 1A and 1B are diagrams that illustrate a method for augmenting an audio/visual broadcast with non-textual annotations in the form of visual labels, according to an exemplary embodiment of the invention.
Figure 1B:
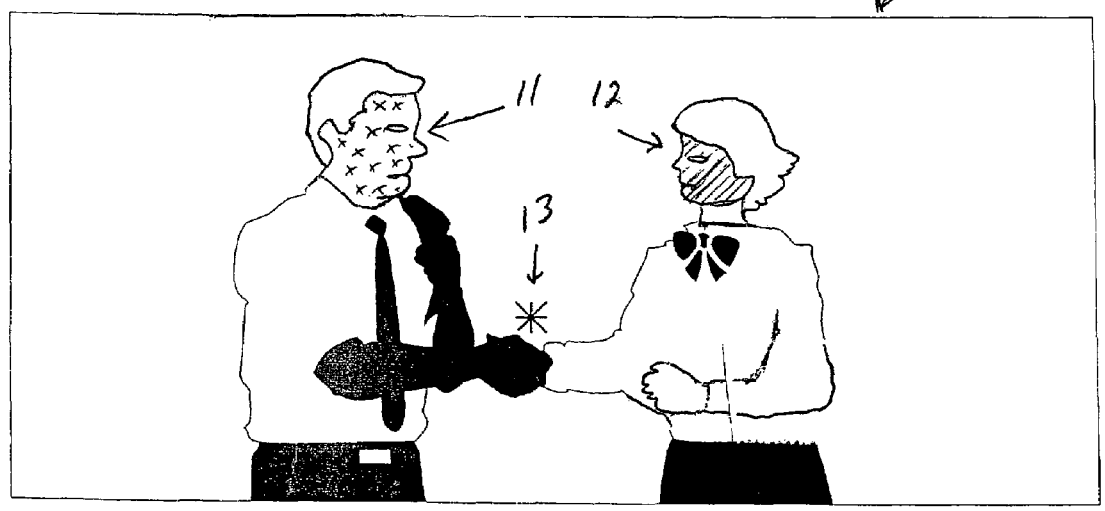

FIGS. 1A and 1B are diagrams that illustrate a method for augmenting an audio/visual broadcast with non-textual annotations in the form of visual labels, according to an exemplary embodiment of the invention. In particular, FIGS. 1A and 1B illustrate a method for augmenting scenes of a movie with non-textual visual annotations to enable a person to recognize and interpret emotional state of individuals in the scenes. The exemplary embodiment of FIG. 1A illustrates a movie scene (10) in which a man and woman are shaking hands, where the scene is depicted as it would be viewed normally without non-textual visual annotations. On the other hand, FIG. 1B depicts the corresponding annotated scene (10') in which a plurality of non-textual annotations (11), (12) and (13) are rendered from metadata associated with the content of the given scene, to thereby assist an autistic individual, for example, to understand and interpret the emotions of the persons in the scene (10').

More specifically, in the exemplary embodiment of FIG. 1B, the non-textual annotation (11) may be a given color (denoted by cross-hatched shading) that is superimposed on the face of the male individual to represent the man's emotional state. Similarly, the non-textual annotation (12) may be another color (denoted by line shading) superimposed on the face of the female individual to represent the woman's emotional state. Different colors and/or labels can be used to symbolically represent different emotions (happiness, sadness, anger, fear, surprise, disgust, etc.) in the form of a visual non-textual modality. For example, in another embodiment, a bright red spot next to a person's face can indicate positive emotions such as happiness and a black spot could indicate a negative emotion like sadness. Moreover, variation in intensity of colored labels can symbolically represent the intensity of the associated emotions (e.g. from extreme enjoyment to calmer happiness). In other embodiments, visual annotations in the form of different geometric patterns such as round or square spots can be used to symbolically represent emotion.

Further, in the exemplary embodiment of FIG. 1B, the non-textual annotation (13) (in the form of a star) disposed near the hands, may be included to direct the viewer's attention to the handshaking gesture between the man and woman. In this regard, the annotation (13) is complementary to the emotional labels (11) and (12) in that focusing one's attention to the handshaking while showing a "happy" emotional state of the individuals in the movie scene can teach an individual that in a social environment, handshaking gestures between two people are representative of positive emotions, for example. In this regard, value can be found in using non-textual annotations that point to persons or objects on the movie scene in various applications.

In other exemplary embodiments of the invention, non-textual annotations for directing one's attention to a given point is a movie scene may be in the form of bright spots, contours, round spots, square spots, geometric patterns. For example, in the exemplary embodiment of FIG. 1B, a bright spot, pulsating colors or special contours, etc., can be superimposed on the hands being shaken or other objects of importance to direct attention.

FIG. 1B illustrates an exemplary method for augmenting the content of a broadcast (movie) with visual annotations that assist in the recognition and interpretation of emotional content in the movie. It is to be understood that the invention is not limited to non-textual annotations with regard to emotions, but that various types of informational content of an audio/visual broadcast can be annotated using one or more modalities (visual, audio, tactile and/or olfactory cues) to assist in interpreting or understanding the content of the broadcast by individuals having various types of cognitive or sensory disabilities. For instance, non-textual annotations can be provided to annotate color in a video for individuals who are color blind. Moreover, odor-based annotations may be provided to assist in understanding or interpreting content. Moreover, for a person with impaired vision, non-textual annotations can be generated to provide visual enhancement of certain content.

In addition, as noted above, informational content can be annotated using two or more complementary modalities. For instance, visual annotations in the form of emotion labels can be complemented with audio labels (via audio phones), where certain music or sounds can be played when a viewer watches persons on a screen to emphasize the person's emotional state.

In other exemplary embodiments of the invention, depending on the intended application, for example, the non-textual annotations associated with an audio/visual broadcast can be broadcast in such a way that the annotations are detectable and viewable only by persons using personal annotation output devices that render and output the broadcast annotation to the user, while the annotations are invisible (not detectable) by persons not using such devices. For instance, in the exemplary embodiment of FIGS. 1A and 1B, the non-textual annotations (11), (12) and (13) may be visual annotations (FIG. 1B) that are only detectable and viewable by a person using a special device (e.g., glasses), while allowing the movie to be viewed by a user without such annotations. Moreover, depending on the modality of the annotation, other special devices may be used that render and output audio or tactile annotations to users of such device to enable content interpretation.

Figure 2:
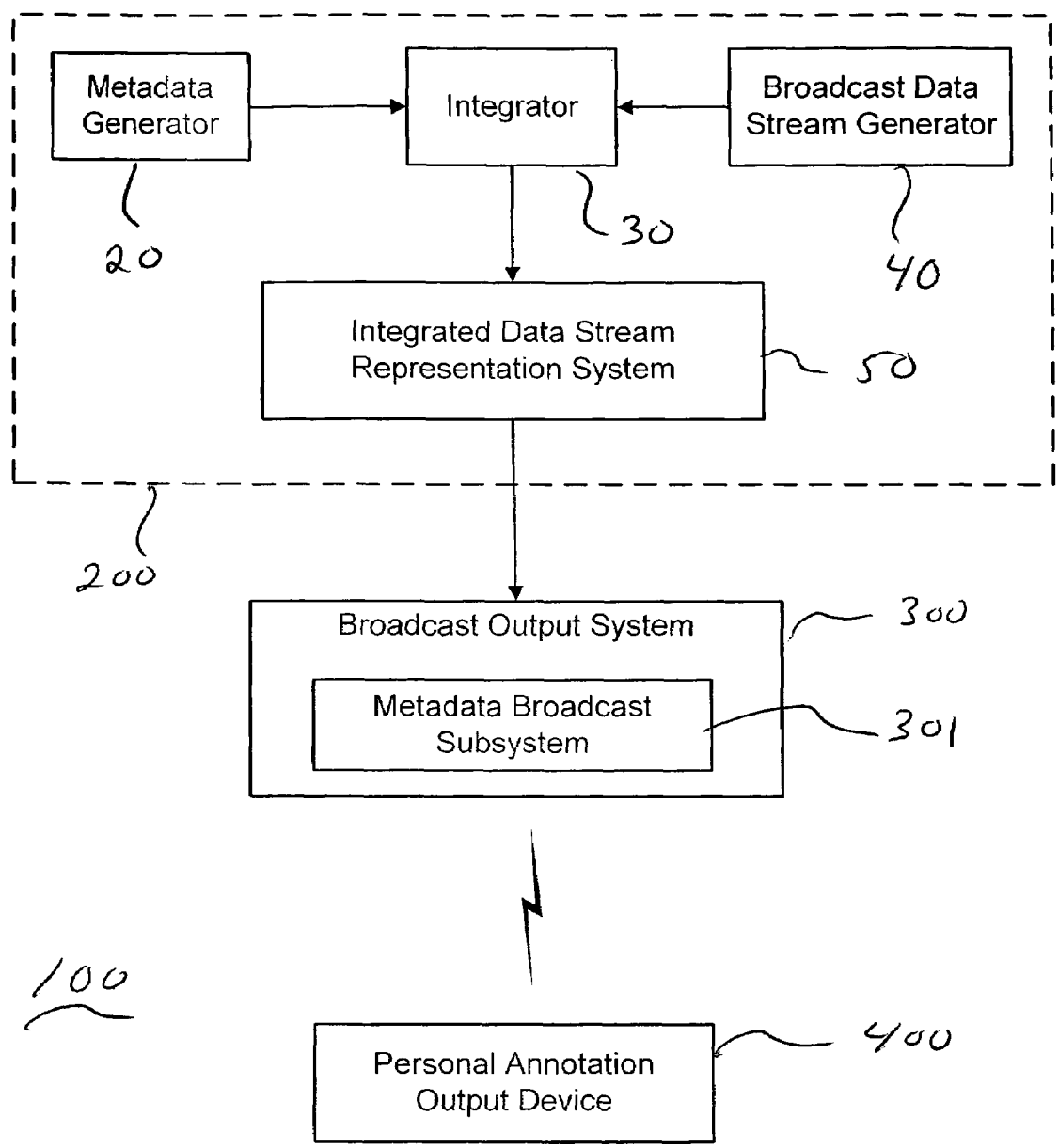
FIG. 2 is a high-level block diagram illustrating a system for augmenting a broadcast data stream (e.g., audio/visual broadcast) with non-textual annotations, according to an exemplary embodiment of the invention.

FIG. 2 is a high-level block diagram illustrating a system for augmenting a broadcast data stream (e.g., audio/visual broadcast) with non-textual annotations, according to an exemplary embodiment of the invention. In general, the system (100) includes an annotation system (200), a broadcast output system (300) and a personal annotation output device (400). In general, the annotation system (200) outputs an audio/visual broadcast data stream which is integrated with one or more streams of annotation metadata for augmenting the broadcast data stream non-textual annotations that symbolically represent one or more types of informational content in the broadcast data. The broadcast output system (300) renders and outputs the audio/visual broadcast data stream in synchronization with the associated metadata stream(s). The broadcast output system (300) comprises a metadata broadcasting sub-system (301) that can output (broadcast) the metadata stream(s) in way such that annotations associated with the broadcast data are detectable with and/or without the use of a personal annotation output device (400). The various system components will now be discussed in further detail.

In one exemplary embodiment of the invention, the annotation system (200) includes a metadata generator (20), an integrator (30), a broadcast data stream generator (40) and an integrated data stream information flow representation system (50). In general, the broadcast data stream generator (40) can be any system or device that generates a content data stream (e.g., an audio data stream, a visual data stream, an audio/visual data stream, etc.) to be broadcast/output. For instance the broadcast data stream generator (40) can be a DVD player for playing a movie from a DVD or a VCR for playing a movie from a tape, etc. The metadata generator (20) outputs metadata that is used to annotate the broadcast data stream with non-textual annotations that symbolically represent informational content of the broadcast data stream. The integrator (30) receives metadata from the metadata generator (20) and generates metadata stream(s) that is/are integrated or otherwise associated with the main broadcast data stream. An exemplary embodiment of the integrator (30) will now be discussed with reference to FIG. 3.

Figure 3:
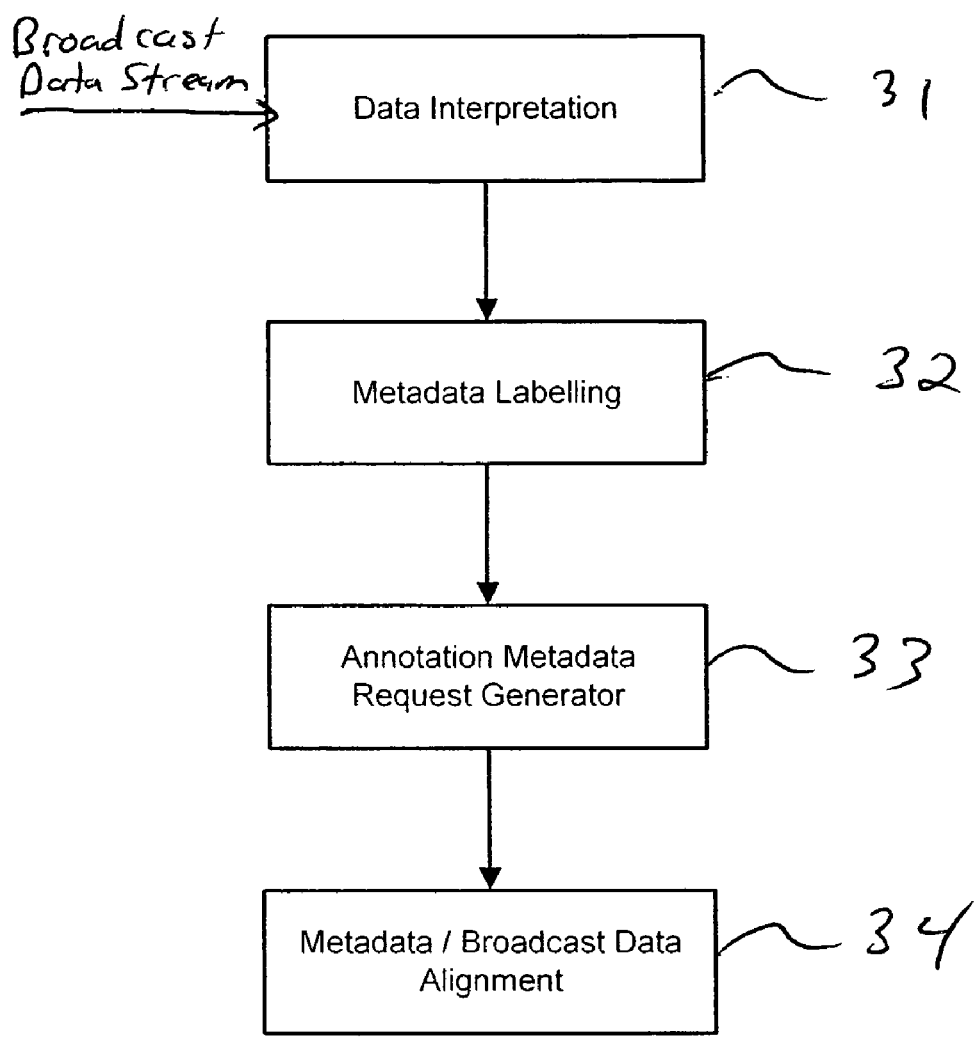
FIG. 3 is a block diagram that illustrates a system for integrating annotation metadata in a data stream according to an exemplary embodiment of the invention.

In general, FIG. 3 is a block diagram that illustrates a system for integrating non-textual metadata in a data stream according to an exemplary embodiment of the invention. The integrator (30) generally includes a data interpreter (31), a metadata labeler (32), a metadata request generator (33) and alignment module (34). The data interpreter (31) implements automated or semi-automated methods for interpreting data segments within a broadcast data stream to identify certain informational content (e.g., emotion data) within data segments and regions of data segments to be labeled by the metadata labeler (32) For example, the data interpreter (31) can process video data for a movie to identify segments of video data containing informational content that can be annotated to symbolically represent such content (e.g., human gestures or body parts can be annotated to shown emotional information). The data interpretation can be performed automatically in real time (for example, when a movie is shown) or manually (or semi-automatically) before the movie is shown in theaters (for example during a movie production)

The metadata labeler (32) labels the data segments with appropriate metadata based on the interpretation results. This metadata is an abstract indication of the informational content associated with the broadcast data. For example, in the context of emotion annotations, the metadata labeler (32) will label a given segment/portion of video data with metadata that indicates, for example, the emotional characteristics (type/level of emotion) that are associated with the portion of the video data. However, the metadata labels generated by the metadata labeler (32) are modality-independent abstract labels, which do not specify the modality (visual, audio, etc.) of the non-textual annotations that will be used to augment the broadcast data stream.

The meta data request generator (33) processes the labeled metadata and obtains annotation metadata from the metadata generator (20) (FIG. 2) that is used to render the non-textual annotations in one or more modalities as predetermined or in a personalized manner (requested by a viewer). For example, a portion of video data containing a person's face may be labeled with metadata which indicates that the person's facial expression shows an emotional state of extreme happiness. But this emotional state and level can be symbolically represented by one or more types of non-textual annotations (e.g., coloring, shapes, sounds, pointers, etc.). The annotation metadata received from the metadata generator (20) is aligned to the main broadcast data stream by the alignment module (34).

Referring back to FIG. 2, the integrator (30) outputs an integrated data stream (comprising a broadcast data stream aligned with one or more annotation metadata streams) to the integrated data stream representation system (50). The integrated broadcast data representation system (50) processes the integrated data stream output from the integrator (30) and renders the integrated data stream in a form that can be output by the broadcast output system (300) and the metadata broadcast subsystem (301). For example, the output system (300) can be a computer display device, a television, movie screen, audio output system, etc, for outputting the broadcast data stream with or without viewer detectable annotations. The metadata broadcast subsystem (301) can broadcast/send metadata information to viewers using various techniques. For instance, when the broadcast output system (300) is a display device or movie screen, for example, the metadata broadcast subsystem (301) can be a device that outputs the annotation metadata stream in synchronization with the main broadcast data stream by displaying subtitles (close captioning), or activating a subset set of pixels in the display device that provides special coloring effect on certain portions of the screen to represent emotions, or a device that output audio signals, etc. In this manner, the broadcast output subsystem (301) can output the metadata in a manner such that the non-textual annotations can be detected without the use of a personal annotation output device (400).

In other embodiments, the metadata broadcasting subsystem (301) may be a device or system that outputs or otherwise broadcasts the metadata stream in a way that the annotation are only detectable using the personal annotation output device (400). For example, the metadata broadcasting subsystem (301) may output the annotated data stream in the form of infrared rays from regions of a display system or screen, which are only detectable using special eyeglasses that can render visual annotations from the infrared rays.

Moreover, the metadata broadcasting subsystem (301) can output radio signals that wirelessly transmit personalized metadata to the personal annotation output device (400), which then processes the annotation metadata and outputs non-textual annotations in one or more modalities to the user, which are supported by the annotation output device (400)

For instance, the personal annotation output device (400) can be a head mounted display that receives and process a personalized metadata stream to output non-textual annotations such as audio, visual, olfactory annotations, etc., detectable only by the user of the device (400). The personal annotation output device (400) can be some form of tactile transducer that produces non-textual annotations in the form of tactile impulses (e.g., vibrations) that are applied to the person's body. By way of particular example, a tactile transducer could output a tactile pulse to the user, which imitates the beating heart pulse of an actor in a movie to illustrate the emotion of freight or surprise, for example.

Figure 4:
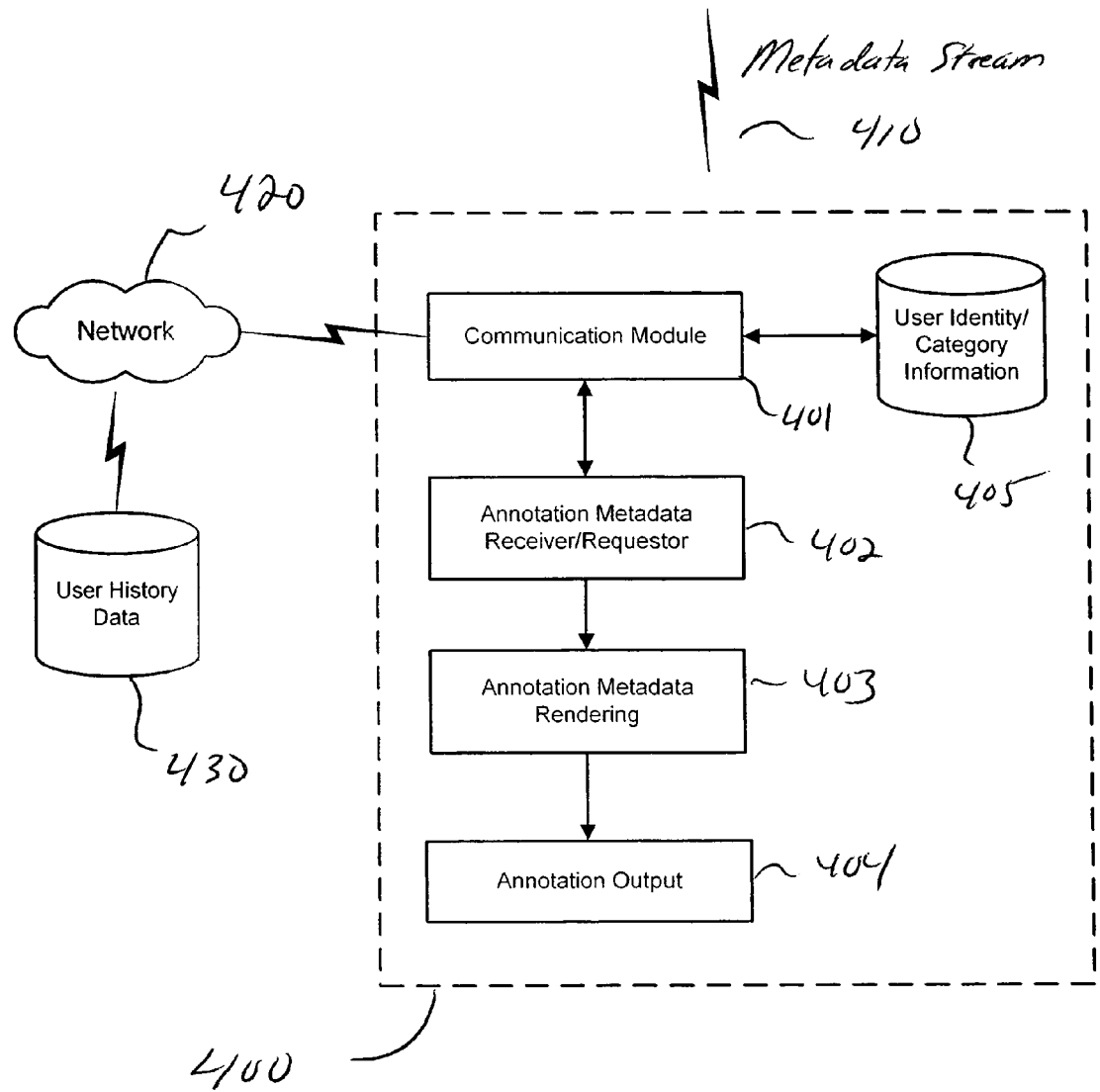
FIG. 4 is a block diagram of a system for processing annotation metadata and generating non-textual annotations according to an exemplary embodiment of the invention.

FIG. 4 is a block diagram of a system for processing annotation metadata and generating non-textual annotations according to an exemplary embodiment of the invention. In particular, FIG. 4 is a high-level schematic depiction of functional components that may be included in the personal annotation output device (400), which receives and processes an annotation metadata stream (410) output from the metadata broadcasting subsystem (301). In general, the annotation output device (400) includes a communication module (401), an annotation metadata receiver/requestor (402), an annotation metadata rendering module (403), and an annotation output unit (404).

The communications module (401) can be, for example, a radio communications system that can receive a metadata stream wirelessly transmitted from the metadata broadcasting subsystem (301) and send the transmitted metadata to annotation metadata receiver/requestor (402). The annotation metadata receiver/requestor (402) can issue requests for personalized metadata streams based on the needs of the particular user of the device (400). These requests can be transmitted by the communications module (401) to the metadata broadcasting subsystem (301).

The type of annotation metadata that is needed by the user can depend on a user identity or how the user is classified (e.g. the user's disability—e.g. autistic person). In one exemplary embodiment, the information about the user identity/category can be persistently stored in a memory (405) device of the non-textual device (400). The communication module (401) can transmit such user information (405) to the metadata broadcasting system (301) to request a personalized metadata stream in one or more annotation output modalities. In another exemplary embodiment, the communications module (401) can access a remote data source (e.g., user history database (430)) via a network (420), which stores user information that can be used to determine the type of annotation metadata that is suitable for the user.

The annotation metadata streams received by the device (400) are processed by the metadata rendering module (403) to generate control signals that cause the annotation output unit (404) to generate and output the non-textual annotations that are perceived by the user. Again, the output unit (404) can be any device capable of generating non-textual annotations one or more of audio, visual, olfactory, tactile modalities, depending on the application and needs of the user.

Figure 5:
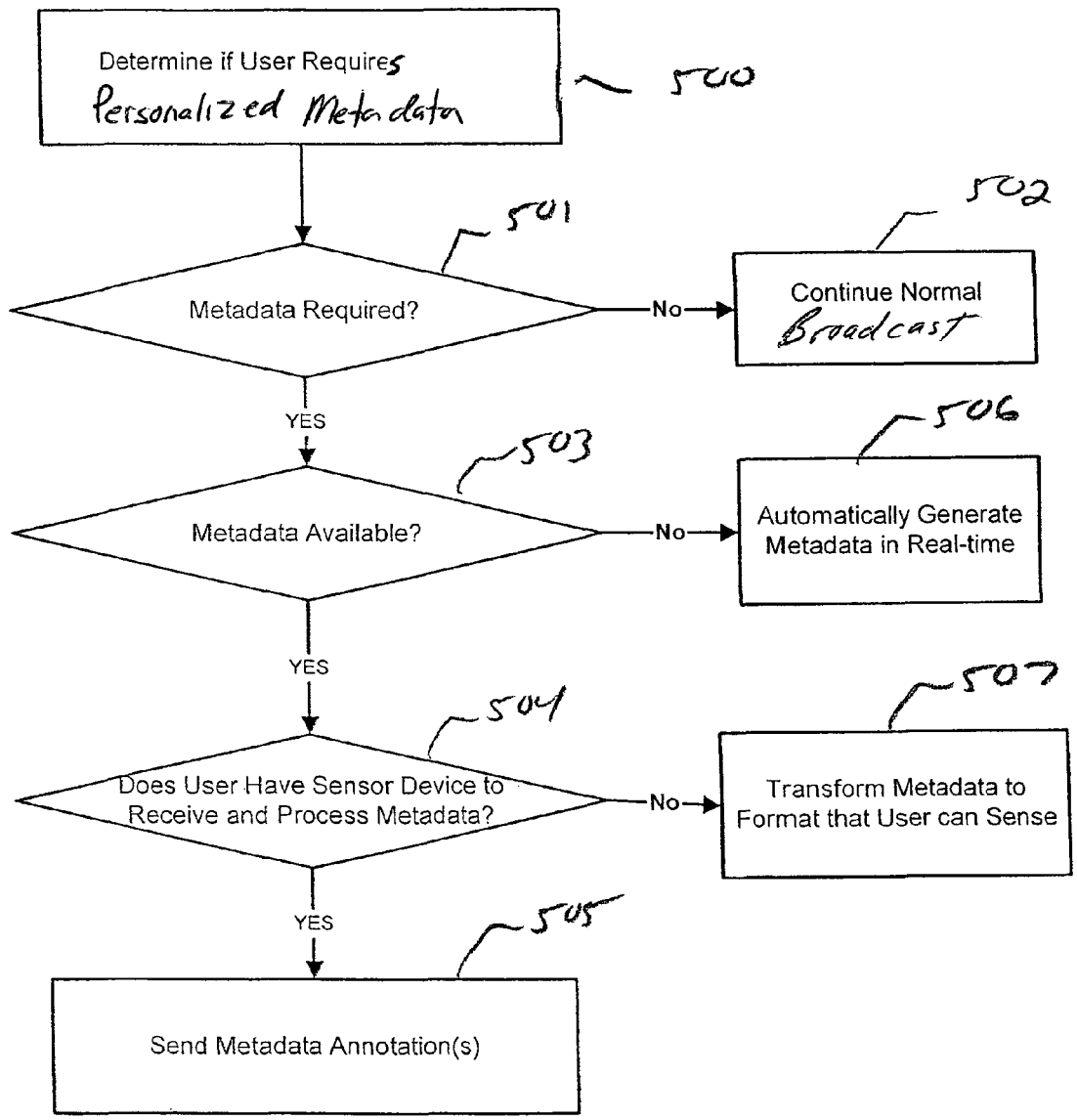
FIG. 5 is a flow diagram of a method for augmenting an audio/visual broadcast with non-textual annotations according to an exemplary embodiment of the invention.

FIG. 5 is a flow diagram of a method for augmenting an audio/visual broadcast with non-textual annotations according to an exemplary embodiment of the invention. When an individual is viewing (or will view) an audio-visual broadcast, the metadata broadcasting subsystem (301) and personal annotation device (400) can be configured to automatically determine whether the viewer requires personalized annotation metadata streams to annotate the broadcast (step 500). For instance, such determination can be made based on the user's identity or profile that is accessed locally or remotely by the personal annotation output device (400) as in FIG. 4, and transmitted via the communications module to the broadcast system.

If personalized metadata is required (affirmative determination in step 501), a determination is made as to whether the personalized metadata for the broadcast is actually available for the given user (step 503). If the metadata is available (affirmative determination in step 503) and the user has a suitable annotation output device to process and render the metadata (affirmative determination in step 504), the required metadata will be transmitted for rendering and output by the device (step 505).

If personalized metadata is not available (negative determination in step 503), the metadata may be generated in real-time (506). If the user does not have the appropriate device to process the metadata for the type of user (negative determination in step 504), the metadata may be transformed to a format that can be rendered to generate non-textual annotations that the user can sense (step 507). For example, an audio/visual data stream having an associated annotation metadata stream for rendering visual emotion labels can be re-processed in real time, whereby the abstract metadata labels of emotion interpretation associated with the main data stream are used to obtain annotation metadata to represent the emotional content in an audio modality. In this manner, a blind person, for example, can listen to the movie and understand emotional content in given scenes based on the audio annotations of emotion.

It is to be understood that the exemplary systems and methods described herein are not limited to annotating broadcast data stream for individuals with cognitive or sensory disabilities. Indeed, the invention can be generally applied in various applications where the use of non-textual annotations can be used to symbolically represent informational content to persons who, under normal conditions, might not be able to extract such information due to a lack of skill or inexperience in a particular area. By way of example, a rookie police officer watching a movie that is specifically prepared to teach about crime fighting and investigation, may find value in visual annotations that that help the person understand the nature of crimes being viewed or how to conduct investigations at crime scenes, e.g., including pointers to certain locations in a crime scene that may point to subtle clues that would help to solve the crime.

Although exemplary embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for annotating a content data stream, comprising:

receiving a content data stream;

annotating a portion of an image representing a person in the content data stream with metadata that symbolically describes emotional information conveyed by the person, wherein the portion is a body part of the person; and outputting the content data stream augmented with non-textual annotations of the portion of the image representing the person having a requested modality for the interpretation or cognition of the annotated content, wherein the emotion information is conveyed by both the portion of the image and the non-textual annotations individually, wherein the non-textual annotations are configured to be detected and processed by a personal annotation output device receiving the outputted content data stream to output the portion of the image and output the non-textual annotations in the requested modality for the interpretation or cognition of the annotated content, wherein the requested modality is transmitted by the personal annotation output device.

2. The method of claim 1, wherein annotating comprises:
identifying a plurality of segments of the content data stream that are representative of a type of information to be annotated; and
labeling said identified segments with said metadata that symbolically represents said type of information.

3. The method of claim 2, wherein identifying is performed automatically.

4. The method of claim 1, further comprising rendering the non-textual annotations using a personal annotation output device which generates and outputs the non-textual annotations to an individual using said device.

5. The method of claim 1, further comprising rendering the non-textual annotations as visual annotations.

6. The method of claim 1, wherein the metadata symbolically represents an emotional level of the emotional information.

7. The method of claim 6, wherein the symbolic representations of emotion are rendered as non-textual annotations in the form of colored objects, wherein different emotions are symbolically represented by different colors.

8. The method of claim 7, wherein the symbolic representations of emotional level of the emotional information are rendered as non-textual annotations in the form of color intensity of the color associated with the emotion.

9. A method for annotating a content data stream, the method comprising:
receiving, by a processor, a content data stream;
annotating, by a processor, content of the content data stream with metadata that symbolically describes information present in the content;
outputting, by a processor, the content of the content data stream in a modality that is directly perceptible by an individual; and
processing, by a processor, the annotated content to output a metadata stream in synchronization with the output content data stream, wherein the metadata data stream is output in a form that is not directly perceptible by an individual, but can be detected and processed using a personal annotation output device to output non-textual annotations in a modality requested for the interpretation or cognition of the annotated content, wherein the requested modality is specified by a receiver of the outputted content data stream, wherein annotating the content of the content data stream with metadata that symbolically describes information present in the content further comprises:
identifying a segment of the content, wherein the content is an audio/visual data stream;
identifying a region of the segment to be annotated, wherein the region is a portion of an image of the segment; and
annotating the region of the segment of the content data stream with metadata that symbolically represents emotional informational content of the region, wherein the metadata is associated with the region and is not associated with another portion of the image of the segment.

10. The method of claim 9, further comprising:
transmitting the metadata stream to the personal annotation output device;
rendering the metadata stream by the personal annotation output device to generate non-textual annotations in one or more modalities supported by said device;
outputting the non-textual annotations to a user of said device.

11. The method of claim 9, further comprising transmitting a request for personalized metadata for the content data stream, which can be rendered for a target modality to non-textually annotate the content data stream.

12. The method of claim 11, further comprising generating the personalized metadata stream in real time when the content data stream is output for viewing.

13. The method of claim 10, further comprising automatically identifying a type of non-textual annotation required by the user of said personal annotation output device.

* * * * *